LIGHT COMMUNICATION SYSTEM UTILIZING TANDEM BROADBAND AND PILOT FREQUENCY AMPLIFICATION
Filed May 13, 1968
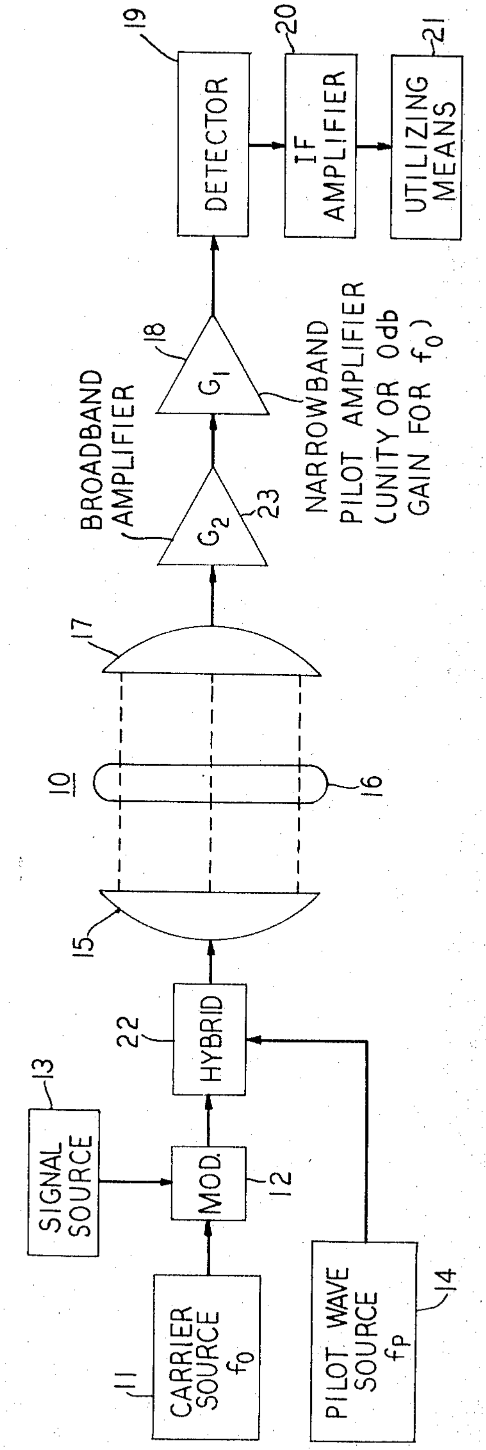
INVENTOR
J. A. ARNAUD
BY Wilford L. Wisner
ATTORNEY

United States Patent Office 3,546,465

Patented Dec. 8, 1970

3,546,465

LIGHT COMMUNICATION SYSTEM UTILIZING TANDEM BROADBAND AND PILOT FREQUENCY AMPLIFICATION

Jacques A. Arnaud, Matawan Township, Monmouth County, N.J., assignor to Bell Telephone Laboratories, Incorporated, Murray Hill and Berkeley Heights, N.J., a corporation of New York

Filed May 13, 1968, Ser. No. 728,417
Int. Cl. H01s *3/10;* H04b *9/00*
U.S. Cl. 250—199 5 Claims

ABSTRACT OF THE DISCLOSURE

An optical frequency carrier transmission system is disclosed in which heterodyne detection is used. A pilot signal is transmitted along with the amplitude-modulated signal, and both signals arrive at the receiving station with similar phasefront and amplitude distortion. Broadband amplification of the signal and pilot followed by narrowband amplification of the pilot signal prior to detection permits heterodyne operation with a significantly improved signal-to-noise ratio.

BACKGROUND OF THE INVENTION

Field of the invention

This invention relates to communication systems using a modulated optical carrier and, more particularly, to such systems in which the signal-to-noise ratio is improved by frequency-selective amplification at the receiver prior to detection.

Description of the prior art

One major problem encountered in communications over large distances, either from point to point on earth or from a point on earth to a celestial station, is phase and amplitude distortion of the energy wavefront due to perturbations by either the atmosphere itself or by system components. In order to employ heterodyne detection at the receiver, it is necessary that the local oscillator signal have the same phase and amplitude characteristic as the incoming signal to be detected. When the wavefront of the incoming signal is distorted, it becomes extremely difficult to provide a local oscillator having the proper characteristic.

As one approach to this problem, the copending patent application of R. Kompfner, Ser. No. 663,692, filed Aug. 28, 1967 and assigned to the assignee hereof, suggests that an optical pilot signal of a frequency equal to the local oscillator frequency desired at the receiver station be transmitted along with the signal-modulated optical carrier. Passing through the transmission medium together, both carrier and pilot experience similar perturbations and both signals, therefore, arrive at the receiving station with substantially similar phase and amplitude distortions. Likewise, any distortions introduced by the system components themselves affect both signals equally. At the receiver the jointly-collected carrier and pilot energy pass through amplification means having a gain curve which peaks at the pilot frequency and has substantially unity (0 db gain) at the carrier frequency. In other words, the pilot amplifier is transparent at the carrier frequency. Thus amplified, the pilot—now the local oscillator wave—and the modulated carrier pass to detection means associated with an optical heterodyne receiver. By virtue of the similarity in phase and amplitude distortion of the modulated carrier and local oscillator, heterodyne detection can be successfully employed. Since the amplitude of the local oscillator wave is large compared with the amplitude of the modulated carrier, a highly acceptable signal-to-noise ratio is afforded.

My analysis has shown that, while Mr. Kompfner's above-described locally-amplified-pilot scheme has many desirable properties, the maximum signal-to-noise ratio that can actually be obtained is directly related to the quantum efficiency of the detector. Typical detectors have quantum efficiencies so low that the final signal-to-noise ratio is a very small fraction of the signal-to-noise ratio that theoretically could be obtained if the only source of noise were local shot noise in the receiver. By shot noise, I mean noise that is directly related to the signal amplitude. Of course, there are always many other sources of noise and other degradation in any optical communication receiver.

It would be desirable to have a receiver arrangement that provided improved results with the presently available detectors.

SUMMARY OF THE INVENTION

According to my invention, I have recognized that the actual signal-to-noise ratio of an optical heterodyne receiver can be made substantially independent of the detector quantum efficiency by amplifying both the transmitted signal wave and the transmitted pilot wave in a wide-band amplifier of bandwidth great enough to accommodate them both before applying them to the narrowband quantum amplifier of the arrangement of the above-cited application of R. Kompfner. The amplifier gains are adjusted to avoid saturation in either one.

It is one advantage of my invention that the achieveable signal-to-noise ratio becomes one-half of the ideal signal-to-noise ratio based solely on shot noise, if the following conditions are satisfied.

First, the power gain, $G_2$, of the wideband amplifier is made substantially larger than $1/\eta$ where $\eta$ is the detector quantum efficiency:

$$G_2 \gg \frac{1}{\eta} \tag{1}$$

where $\eta<1$ and the double inequality signifies more than an order of magnitude difference in value. The quantity $\eta$ is also approximately the so-called degradation factor of the arrangement of the above-cited application of R. Kompfner.

Second, the power gain, $G_1$, of the narrowband pilot wave amplifier is made substantially larger than $1/D$ where D is another degradation factor which will be mathematically defined hereinafter.

$$G_1 \gg \frac{1}{D} \tag{2}$$

The significant fact is that the relationships set out in Equations 1 and 2 make the achievable signal-to-noise ratio much less dependent on the detector quantum efficiency than heretofore.

If, for practical reasons, the total gain $G_1 \times G_1$ is limited to a value G, then the best signal-to-noise ratio is obtained if $$1+\frac{2}{\sqrt{D\eta G}} \leq 2\eta G_1 \leq 4D\eta G \tag{3a}$$

$$1+\frac{2}{\sqrt{D\eta G}} \leq 2DG_2 \leq 4D\eta G \tag{3b}$$

and it can be optimized if $$\frac{G_2}{G_1}=\frac{D}{\eta} \tag{4}$$

which is a special case of the inequalities (3*a*) and (3*b*).

BRIEF DESCRIPTION OF THE DRAWING

The many advantages and attributes of the invention together with its mode of operation, can be more readily understood from reference to the accompanying drawing and to the detailed description thereof, in which the sole figure is a block diagram of an illustrative system in accordance with the invention.

DETAILED DESCRIPTION

Description of the transmitter

Referring now in detail to the figure, there is shown an optical transmission system 10 in accordance with the principles of the invention in which a source 11 of frequency $f_0$ supplies an optical carrier signal to modulation means 12. Simultaneously, source 13 supplies to modulator 12 an information-bearing signal to be transmitted on the carrier. At optical frequencies, source 11 can be a laser with modulator 12 situated either outside or inside the laser cavity. One typical internal modulation arrangement is disclosed, for example, in the copending, commonly-assigned application of I. P. Kaminow, Ser. No. 379,273, filed June 30, 1964 and now Pat. No. 3,405,370. A second optical source 14, of constant frequency $f_p$ different from $f_0$ by the intermediate frequency desired at the receiving terminal, supplies a pilot signal which is superposed with the output of modulator 12, typically by means of a suitable hybrid 22. The combined signal and pilot waves are applied to a transmitting means 15. The hybrid 22 could be a partially-transmissive partially-reflective planar mirror oriented with its surface at 45° with respect to both team paths. Transmitting means 15 can comprise, for example, an optical lens system emitting a collimated beam of parallel light rays into the atmosphere 16. Alternatively, the transmission from transmitting means 15 to receiving means 17 can be over an enclosed medium including a series of redirectors such as lenses disposed within a continuous light pipe. In the figure, the propagation of modulated carrier wave and pilot wave is indicated by dashed lines 16 extending between transmitting means 15 and receiving means 17.

Explanation of the transmission problem

For purposes of discussion, we will designate the mean power of the modulated carrier at receiving means 17 as $S_0$ and the mean power of the pilot signal at the receiving means 17 as $P_0$. Under ideal circumstances a receiver of optical radiation which receives a signal with a mean power $S_0$ will have a signal-to-noise ratio at the detector equal to $S_0$ times the quantum efficiency of the detector, divided by photon shot-noise power at the detector input. When the detector is a photomultiplier, this $S/N$ ratio can be closely approached even when circumstances are not ideal; as, for example, when inhomogeneities in the atmosphere tilt and scramble the signal wavefronts. As long as all the radiation intercepted by the receiving antenna reaches the detector, it does not matter that the distribution of phase and amplitude is chaotic over the detector, and electrons will be emitted everywhere in proportion to the local intensity of radiation so that the total signal current will be proportional to the integral of the intensity over the detector surface.

If the atmosphere were homogeneous, or well behaved, it should in principle be possible to concentrate the received signal radiation into an area $A_0$ dependent only on the tangent of the angle subtended at the detector by the effective antenna aperture radius.

A real atmosphere will perturb the radiation so that, on the average, it will occupy an area A which always will be larger than $A_0$. We may express this fact by saying that the signal is now carried by $n$ modes, where $n$ is the ratio between A and $A_0$. As long as the photocathode of the photomlutiplier is larger than A, the signal-to-noise ratio remains as described.

When a plurality of modes are propagating, conventional preamplification of the signal-bearing carrier at the receiver will produce an excessive total noise proportional to the number of modes amplified; and a degraded signal-to-noise ratio will be obtained. Furthermore, any heterodyne detection system with a local oscillator signal generated at the receiver would be rendered inoperative by the scrambled phasefront of the received signal and the unscrambled phasefront of the local oscillator. The latter shortcoming is overcome in the arrangement of the above-cited patent application of R. Kompfner by transmitting signal and pilot together over the same transmission path. The result is that both signal and pilot are identically scrambled and arrive at the receiver with matching phasefronts.

Description of the receiver

Moreover, in that arrangement, the received pilot wave power $P_0$ is amplified by an amplifier like amplifier 18 in the figure before both signal and amplified pilot pass to mixing detector 19 and on to standard intermediate-frequency amplifier 20, and thence to utilizing means 21. The pilot amplifier is transparent to the signal carrier frequency. That is, amplifier 18 has unity gain or 0 db gain for the carrier frequency $f_0$. Thus, in the Kompfner arrangement the received signal carrier power $S_0$ passes to detector 19 unamplified while the amplitude of $P_0$ is increased by a gain $G_1$, that typically satisfies Equation 2 above. The pilot signal, as amplified, becomes the local oscillator. The overall arrangement can thus be called a locally-amplified pilot heterodyne detection arrangement.

In accordance with the principles of the present invention, a broadband amplifier 23 is inserted in the receiver in tandem between the receiving means 17 and narrowband amplifier 18. The bandwidth of amplifier 23 encompasses the frequency spectra of both the received signal carrier wave and the received pilot wave. Its power gain, $G_2$, is selected according to Equation 1 above, which is repeated here $$G_2 \gg \frac{1}{\eta} \qquad (1)$$

where $\eta$ is the detector quantum efficiency and also approximately the degradation factor of the arrangement of the above-cited application of R. Kompfner.

The respective degradation factors of Equations 1 and 2 may be defined and explained as follows.

As shown by Kogelnik and Yariv in 52 Proceedings of I.E.E.E., 165 (1964), each of $n$ modes of an optical amplifier contributes optical noise in the amplification process. Since the incoming pilot is made up of a plurality of modes, the locally-amplified pilot, or local oscillator signal, will be constructed of power $P_0$ times gain plus noise mode power times gain. Thus, the locally-amplified pilot is a noisy local oscillator, and will, therefore, modulate the signal $S_0$ with a noise contribution. However, only one of the $n$ noise modes of locally-amplified pilot will beat effectively with the signal because the noise modes are not correlated with the signal modes. What is more important is that the bandwidth of amplification of the narrowband pilot amplifier 18 can be made as small as we wish since the pilot wave to be amplified does not carry any information and consists of a single frequency. Therefore, the optical noise generated by amplifier 18 can be made negligibly small by frequency filtering. From this fact, one can derive directly the degradation factor of the Kompfner arrangement. The aforesaid frequency filtering, however, must preserve the phasefront of the incident pilot wave. This result can be accomplished by employing so-called degenerate optical resonators.

The degradation factor D of Equation 2 above, which is the degradation factor for prior art amplified-direct-detection arrangements, when the information bandwidth is equal to the wideband quantum amplifier bandwidth W, is given by $$D = \frac{S_0}{nh\nu W} \qquad (5)$$

where $S_0$ is, as before, the signal power, $n$ is the number of propagating modes and $h\nu$ is the photon energy. An amplified-direct-detection arrangement is a nonheterodyne arrangement in which the received signal carrier is amplified without mixing and then the signal is detected directly. D is also the degradation factor of an arrangement like that of the drawing but without a pilot wave amplifier 18.

A typical pilot amplifier 18 is an optical maser, or laser, amplifier having a gain curve peaked at the pilot frequency and falling off to approximately unity gain at the signal carrier frequency.

When the pilot amplifier 18 is to operate in a frequency region for which not much gain per unit length is obtainable, it is advantageous to use a regenerative-type amplifier which provides gain at the cost of bandwidth, a feature which is particularly welcome in the present arrangement. I particularly prefer a regenerative ring laser amplifier such as disclosed in my copending patent application, Ser. No. 695,466, filed Jan. 3, 1968, and assigned to the assignee hereof. Other amplifiers with degenerate resonators are known. It should be noted that as said before, the amplifier 18 should be capable of amplifying all the transverse modes of the pilot with approximate uniformity. This result is achieved by the ring laser amplifier of my above-cited application most fully in the amplification of the modes in the plane of the ring amplifier.

A typical broadband amplifier 23 is an optical parametric amplifier arranged to receive the input signal carrier wave and a high power pumping beam (not shown). The pumping power level is made sufficiently high that the amplifying bandwidth of the parametric amplifier is substantially greater than that of a laser amplifier. In a specific proposed embodiment, this result could be achieved by pumping a parametric amplifier such as a barium sodium niobate parametric amplifier at a level at least an order of magnitude above the level at which useful parametric amplification can be obtained. The effective bandwidth of the laser amplifier will then be more than adequate to accommodate the spectrum of most contemplated signal carrier waves and pilot waves. Further details of barium sodium niobate parametric oscillators may be found in the copending application of Messrs. J. E. Geusic S. Singh and R. G. Smith, Ser. No. 716,955, filed Mar. 28, 1968 and assigned to the assignee hereof.

Mixing detector 19 is either an indium arsenide (InAs) junction photodiode or a photomultiplier. The advantages of my invention over the prior art will be greatest when detector 19 is a photomultiplier, which has a relatively low quantum efficiency, $\eta$.

Operation of the disclosed embodiment

In the operation of the embodiment of the drawing, the tandem combination of a broadband signal and pilot amplifier with a narrowband pilot amplifier provides a signal-to-noise ratio far better, when Equations 1 and 2 above are satisfied or, when the total gain is limited by practical considerations, when Equations 3 and 4 above are satisfied, than the optimum signal-to-noise ratio that can effectively be obtained in either an amplified-direct-detection arrangement or in a locally-amplified pilot heterodyne detection arrangement.

It can be seen that in the embodiment of the figure, there exist corresponding quantities which permit us to evaluate D, as defined above. When D is significantly smaller than unity (small signal powers), my arrangement has a $S/N$ ratio given in general by $$S/N=\frac{\frac{1}{2}(S/N)_{\mathrm{I}}}{\frac{1}{2\eta G_2}+1+\frac{1}{2DG_1}} \tag{6}$$

where $(S/N)_{\mathrm{I}}$ is the ideal signal-to-noise ratio mentioned above as being obtained when the only source of noise is signal-amplitude-dependent shot noise in the receiver. As mentioned before, the broad preferred range of operation of the proposed receiving scheme is obtained when $\eta G_2 \gg 1$ and $DG_1 \gg 1$. As an optimum, when Equations 1 and 2 above are satisfied, half the optimum $S/N$ ratio is obtained for any detector quantum efficiency (unlike the arrangement of the above-cited patent application of R. Kompfner) and for any received signal power (unlike the prior art arrangements for amplified-direct-detection) and for any wave-front distortions exhibited by both signal and pilot within the effective detector area (unlike heterodyning).

Another advantage of the proposed scheme with respect to the above-cited application of R. Kompfner is that it requires much less gain from the quantum amplifiers. They also do not need saturation power levels in my scheme as high as in the Kompfner scheme and, in fact may have about equal output powers. In describing this condition, one does not include the amplified signal carrier power as part of the output power of pilot wave amplifier 18, since the carrier power simply passes therethrough with unity gain. Thus, the condition is one of equal signal carrier and pilot wave powers.

Then, $$D\leq\frac{G_2}{G_1}\leq\alpha D \tag{7}$$

where $\alpha$ depends on the active medium of pilot amplifier 18 and is typically about 10. As a practical matter, obtaining the optimum signal-to-noise ratio by means of the relationship of Equation 4 above will usually be more important than employing amplifiers with approximately equal saturation power levels.

Moreover, "hole-burning" in the gain curve of the inhomogeneously-saturating narrowband pilot wave amplifier 18 will usually means that, to prevent saturation from occurring, we must adjust $G_2/G_1$ to be very near $D/\eta$, if the ratio of the Doppler-broadened linewidth to the natural linewidth of the laser active medium is on the order of $1/\eta$. Inhomogeneous saturation refers to the characteristic of many lasers which permits available gain to be depleted at one frequency while not being depleted at other frequencies within the gain-versus frequency characteristic, for which other frequencies net gain is available. Doppler-broadening is a broadening of the band of frequencies at which gain is available because of relative motion of active particles.

Another condition on the gains $G_2$ and $G_1$, which may restrict them more than Equations 1 and 2 above if the noise current, $i$, of detector 19 is larger than desirable, is as follows:

$$G_1G_2^2\gg\frac{i^2\cdot h\nu}{(\eta e)^2S_0B} \tag{8}$$

where B is the frequency spectrum or bandwidth of the signal carrier wave, $e$ is the charge of an electron, and the other quantities have been defined above.

The following example gives typical $S/N$ gain, and power for realistic values of the parameters. In this example, the pilot power P is taken as four times the signal power $S_0$.

Assume the signal power $S_0$ is $10^{-9}$ watts, the carrier wavelength is $3.5\mu$ (a xenon laser line), the detector quantum efficiency $\eta$ is 0.2, the frequency spectrum or bandwidth B of the signal carrier is 100 megahertz (one hertz is one cycle per second), and the number of carrier modes received is 2,000. An amplified-direct-detection arrangement provides a signal-to-noise ratio of −2 db, the Kompfner locally-amplified-pilot arrangement provides a signal-to-noise ratio of 9.5 db, and the arrangement of the figure provides a signal-to-noise ratio of 13.5 db.

Assume further that the detector noise follows the conventional relationship $8\pi KTCB^2$, where K is Boltzmann's constant, T is the absolute room temperature assumed to be 290° Kelvin, C is the detector capacitance assumed to be 7 picofarads and B is given above as 100 megahertz. To achieve the above (—2 db) signal-to-noise ratio, the amplifier of prior art direct-detection schemes must provide a minimum power of 7.6 microwatts and a minimum gain of 25 db. For the 9.5 db signal-to-noise ratio, the Kompfner pilot wave quantum amplifier must provide 384 microwatts and a gain of 62 db. In either case, the signal-to-noise ratios would not be significantly improved by higher powers and gains. In my arrangement, the broadband quantum amplifier 23 ($W$=200 megahertz) need provide only 4.5 microwatts and a gain of 23 db and narrowband amplifier ($W'$=2.2 megahertz or less) need provide only about 5 microwatts and a gain of about 20 db to achieve the signal-to-noise ratio of 13.5 db.

What is claimed is:

1. An optical communication system comprising means for transmitting a modulated optical carrier in combination with a pilot wave of differing frequency and means for receiving said carrier and pilot waves comprising means for collecting said waves, means for amplifying said pilot wave while transmitting said modulated carrier wave with substantially unity gain and means having a detection quantum efficiency $\eta$ for detecting a modulated wave of frequency equal to the difference of the center frequencies of said carrier and pilot waves, and means in tandem between said collecting means and said pilot wave amplifying means for amplifying both said signal wave and said pilot wave together with a power gain substantially greater than $1/\eta$ and preserving their wavefront relationships.

2. A system according to claim 1 in which the power gains $G_2$ of the tandem amplifying means and $G_1$ of the pilot wave amplifying means are respectively $$G_2 \gg \frac{1}{\eta},\ G_1 \gg \frac{1}{D}$$

where $\eta$ is the detection quantum efficiency and D is the degradation factor associated with said system in the absence of the pilot wave amplifying means whereby the signal-to-noise ratio of the receiving means becomes substantially independant of the detection quantum efficiency $\eta$.

3. A system according to claim 2 in which $$1+\frac{2}{\sqrt{D\eta G}} \leq 2\eta G_1 \leq 4D\eta G$$

and $$1+\frac{2}{\sqrt{D\eta G}} \leq 2DG_2 \leq 4D\eta G$$

where $G=G_1G_2$.

4. A system according to claim 2 in which $$\frac{G_2}{G_1} \cong \frac{D}{\eta}$$

whereby the signal-to-noise ratio of the receiving means is the best which can be achieved for a given total gain $G=G_1\times G_2$.

5. A system according to claim 1 in which $$G_1G_2{}^2 \gg \frac{i^2 \cdot h\nu}{(\eta e)^2 S_0 B}$$

where $i$ is the detector noise current, $h\nu$ is the signal photon energy, $\eta$ is the number of propagating modes, $e$ is the charge of an electron, $S_0$ is the received signal carrier wave power and B is the frequency spectrum of the signal carrier wave.

References Cited

UNITED STATES PATENTS 3,302,120 1/1967 Kluver .......... 250—199UX

ROBERT L. GRIFFIN, Primary Examiner

J. A. BRODSKY, Assistant Examiner

U.S. Cl. X.R.

330—4.3; 332—7.51